(12) United States Patent
Ackermann et al.

(10) Patent No.: US 8,523,973 B2
(45) Date of Patent: Sep. 3, 2013

(54) FILTER ELEMENT FOR FLUID FILTRATION, IN PARTICULAR FOR INTAKE AIR OF INTERNAL COMBUSTION ENGINES

(75) Inventors: Steffen Ackermann, Otterstadt (DE); Michael Kaufmann, Meckenheim (DE); Klaus-Dieter Ruhland, Mechenheim (DE)

(73) Assignee: Mann + Hummel GmbH, Ludwigshafen (DE)

( * ) Notice: Subject to any disclaimer, the term of this patent is extended or adjusted under 35 U.S.C. 154(b) by 0 days.

(21) Appl. No.: 13/607,715

(22) Filed: Sep. 8, 2012

(65) Prior Publication Data

US 2012/0324849 A1 Dec. 27, 2012

Related U.S. Application Data

(63) Continuation of application No. PCT/EP2011/053594, filed on Mar. 10, 2011.

(30) Foreign Application Priority Data

Mar. 10, 2010 (DE) .......................... 10 2010 010 964

(51) Int. Cl.
*B01D 46/00* (2006.01)
(52) U.S. Cl.
USPC .................................. 55/498; 55/502; 55/492

(58) Field of Classification Search
None
See application file for complete search history.

(56) References Cited

U.S. PATENT DOCUMENTS

| | | | |
|---|---|---|---|
| 4,720,292 A * | 1/1988 | Engel et al. ...................... | 55/337 |
| 6,599,342 B2 * | 7/2003 | Andress et al. .................. | 55/495 |
| 7,090,708 B2 * | 8/2006 | Winter et al. ................... | 55/357 |
| 2002/0040870 A1 * | 4/2002 | Paul .............................. | 210/437 |
| 2003/0222010 A1 * | 12/2003 | Bassett et al. ................. | 210/312 |
| 2005/0211623 A1 * | 9/2005 | Moscaritolo et al. ......... | 210/440 |
| 2006/0196822 A1 * | 9/2006 | Koehler et al. ............... | 210/437 |
| 2009/0320425 A1 * | 12/2009 | Dworatzek et al. ............ | 55/504 |
| 2010/0126919 A1 * | 5/2010 | Hawkins et al. .......... | 210/167.08 |

* cited by examiner

*Primary Examiner* — Duane Smith
*Assistant Examiner* — Phillip Shao
(74) *Attorney, Agent, or Firm* — James Hasselbeck

(57) ABSTRACT

A filter element (1) for fluid filtration has a hollow-cylindrical filter medium (2) folded in a star shape, an outlet-side end plate (3) and a second end plate (4), a hollow-cylindrical supporting mesh (5) disposed in the interior (6) of the filter medium, wherein at the outlet-side end of the filter element, the supporting mesh has a connecting region (11) in which the supporting mesh (5) is provided with a coupling element (7). In the connecting region (7) the supporting mesh (5) includes a radially outwardly projecting collar (8) protruding beyond the outlet-side end face (9) of the filter medium. The outlet-side end plate (3) encloses the outlet-side end face (9) of the filter medium (2) and the collar (8) and has an annular axial seal (10).

11 Claims, 5 Drawing Sheets

FILTER ELEMENT FOR FLUID FILTRATION, IN PARTICULAR FOR INTAKE AIR OF INTERNAL COMBUSTION ENGINES

CROSS REFERENCE TO RELATED APPLICATIONS

This application is a bypass continuation of international application PCT/EP2011/053594, filed Mar. 10, 2011 designating the United States and which is hereby incorporated by reference in its entirety. This application claims the benefit under 35 USC 119 of foreign application DE 10 2010 010 964.9 filed in Germany on Mar. 10, 2010, and which is hereby incorporated by reference in its entirety.

TECHNICAL FIELD

The invention concerns a filter element for fluid filtration, in particular for intake air of internal combustion engines and an air filter unit.

BACKGROUND OF THE INVENTION

The publication WO 2008/015100 A1 discloses a filter element in a radially divided housing wherein the end disks of the filter element are provided with connecting elements for connecting the filter element with housing parts and wherein the housing parts are fixed in their position by means of the filter element. With this arrangement, the requirements with regard to component tolerances, in particular with respect to axial length tolerances, are high.

The invention has the object to provide a filter element that improves the tolerance conditions and ensures a reliable sealing action.

SUMMARY OF THE INVENTION

The invention has the object to provide a filter element that improves the tolerance condition and ensures a reliable sealing action.

The filter element according to the invention comprises a hollow-cylindrical, in particular star shape-folded filter medium as well as an outlet-side end disk and a second end disk and a hollow-cylindrical support lattice (also referred to as central tube) that is arranged in the interior of the filter medium. The support lattice is preferably resting against the inner wall of the hollow-cylindrical filter medium and extends from the outlet-side end disk to the second end disk.

According to the invention, the support lattice has at the outlet-side end of the filter element a connecting area in which the support lattice is provided with a coupling element for coupling the filter element to a filter housing, in particular to the outlet socket of a filter housing, wherein the coupling element is arranged preferably in radial direction inwardly and, in particular, is embodied as a form-fit connection, for example, as a thread or a bayonet closure. Also, outer threads or outwardly positioned bayonet closures are possible. Alternatively, a snap connection or clamping connection may be provided.

According to the invention, the support lattice has in the connecting area a collar that in radial direction projects outwardly and projects partially past the outlet-side end face of the filter medium. The collar, together with the outlet-side end face of the filter medium, is enclosed by the outlet-side end disk, wherein as end disk material an elastically deformable plastic material, in particular polyurethane (PUR), is used. The outlet-side end disk has an annular axial seal for separating the raw side from the clean side in a filter housing. The axial seal is preferably embodied monolithically with the outlet-side end disk as an annular axial projection that upon assembly of the filter element can be compressed within a housing.

The outlet-side end face of the filter medium must not directly rest on the collar in the filter element according to the invention but, in an advantageous embodiment, can be slightly spaced apart from it (for example, approximately 0.5-5 mm, in particular 0.5-2 mm) This has the advantage that length tolerances of the filter medium have no effect on the length of the entire filter element. Moreover, the advantage resides in that a complete enclosure of the collar by the end disk material is provided.

A preferred embodiment provides that the filter element, at a support lattice in the area of an end disk or directly on an end disk, has a threaded projection with, in particular, a conical thread as a coupling element. As a result of the conical embodiment of the threaded projection and a matching threaded bore in the housing, a self-centering action is provided when the air filter element is pushed onto the housing element. A rotation about a relatively small angle is then sufficient in order to cause a plurality of thread turns to engage with each other and to provide in this way a corresponding high strength of the thread connection with regard to axial forces.

In this connection, it has been found to be advantageous to employ a buttress thread which is well suited as a moving thread, which is dirt tolerant, and which moreover can be easily moved. For example, a conical buttress thread is suitable that at a diameter of approximately 100 mm has 2 to 5, preferably 3, thread turns. In one embodiment, the thread turns are arranged at a conical angle of approximately 3 degrees to 12 degrees, preferably 3+/−0.5 degrees.

In an advantageous embodiment, the connecting area has at one end an axial contact surface for contacting a filter housing. In this way, upon assembly the end position of the filter element is determined substantially by the size of the support tube. The seal is deformed precisely to such an extent as permitted by the geometry of the connecting area. In this way, the position of the filter element is independent of the hardness tolerances and size tolerances of the axial seal.

In one embodiment, the material at the outlet-side end disk has a lesser Shore hardness than the material of the support lattice.

In an advantageous embodiment, the axial seal with regard to the radial position is arranged in the area of the collar. In this way, the force that is generated by clamping the filter element in the housing is acting on the collar and is supported by it. In this way, shearing forces at the connecting locations between the end disk material and the filter material or support lattice material can be avoided.

In an advantageous further embodiment, between collar and end face of the filter medium a gap is provided that is filled by the end disk material. In this way, the transmission of forces generated at the axial seal onto the filter medium can be minimized.

In one embodiment, the collar is embodied as a lattice. In this way, the end disk material can penetrate the collar. This has the advantage that the loadability of the connection between collar and end disk material is improved.

In one embodiment, the axial seal, in the unclamped state, projects past the axial contact surface. When assembling the filter element, the seal, independent of its height in the unclamped state, is compressed in this way up to the level of the contact surface.

In one embodiment, the sealing surface of the housing serves at the same time as a stop for the contact surface of the support lattice.

In one advantageous embodiment, the collar comprises a first section extending parallel to the center axis and a second section that extends perpendicular to the center axis and adjoins the first section. The sections define in this way an angle that encloses the inner edge of the outlet-side end face of the filter medium.

In an advantageous further embodiment, the first section extends parallel to and at a spacing relative to the connecting area of the support lattice. In this connection, it is advantageously connected by means of an annularly extending web, or a plurality of webs arranged in circumferential direction, with the connecting area. In this way, the collar can be embedded in such a way in the outlet-side end disk that the material of the end disk is not connected with the main part of the support lattice or is not connected with the connecting area. This is particularly advantageous in end disks which are produced by a casting method, in particular in casting molds, from materials that in the raw state are flowable, for example, polyurethane (PUR), and which are connected in this way with the filter medium and the collar.

In one embodiment, the second end disk is of a closed embodiment.

In an advantageous embodiment, the second end disk has a connecting element for connecting the filter element with a housing part. The connecting element is in particular embodied as a bayonet closure, thread, snap or locking connection. The second end disk is preferably produced, preferably by injection molding, of a material (for example, PP, PE, PA) that is hard in comparison to the outlet-side end disk.

It is also possible to provide a snap connection, in particular an annular snap connection which is in particular advantageous when the filter element and the housing bottom part or cover are to be replaced as a non-releasable unit in a service situation. The filter element is then suitable to be locked—releasably or non-releasably—with a housing part.

The invention concerns furthermore an air filter unit with a radially dividable housing and a filter element insertable therein according to one of the preceding claims, wherein the housing has at least two housing parts that in axial direction are to be connected to each other by a tie anchor element wherein the tie anchor element is formed by the filter element and in particular by the support lattice.

A preferred embodiment of the filter element and of the air filter unit provides on the housing bottom part or on the cover in the area of the connecting element at least one radially slidable locking element that engages the connecting element wherein the connecting element is embodied as a groove, undercut or another engagement recess in a ledge on the end disk of the air filter element so that the filter element is locked with a housing part by form fit.

Inasmuch as the engagement recess on the air filter element is embodied as a continuous groove, positioning of the filter element relative to the housing part is possible in any position.

In a preferred embodiment, at the interface between the housing parts no fastening or locking elements are provided. In this way, with the slidable locking elements, the housing cannot be held together without inserted filter element and thus operation of the filter unit without air filter element is not possible.

In an advantageous further embodiment, the second end disk is connected fixedly, and defined with respect to its axial position, to the support lattice, for example, by a glued, screwed, snap-on or weld connection, or preferably by a potting compound, for example, melt adhesive or polyurethane (PU) foam which upon curing connects the second end disk with the filter medium and the support lattice with form fit and encloses seal-tightly the second end face of the filter medium. In this connection, it is advantageous when the inner side of the end disk is resting immediately on the support lattice.

The fixed connection of the support lattice with the second end disk has the advantage that the support lattice of the filter element can be used as a tie anchor in a filter housing that is divided radially, i.e., perpendicularly to the center axis of the filter element, and that has separate housing parts. In this way, closure elements or tie anchor elements on the housing are not needed. In this way, it can be advantageously effectively ensured that a connection of the housing parts without inserted filter element embodied in accordance with the invention is not possible because then the housing parts would fall apart. It is therefore in particular not possible to operate the air filter unit deliberately or carelessly without inserted air filter element.

A further advantage is that by the defined connection of the second end disk with the support lattice the total length of the filter element and therefore in particular the spacing between the axial contact surface and the connecting element of the second end disk is producible with minimal tolerances, independent of material quality fluctuations of the end disk material of the outlet-side end disk and independent of length tolerances of the filter medium.

In this way, solely the axial length of the support pipe has an effect on the position of the housing part connected with the second end disk. Length tolerances of the first outlet-side end disk or of the filter medium remain without any effect because, firstly, the axial position of the filter element is defined by the coupling element or the connecting area of the support lattice and, secondly, the axial position of the connecting element of the second end disk is defined by the length of the support lattice.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
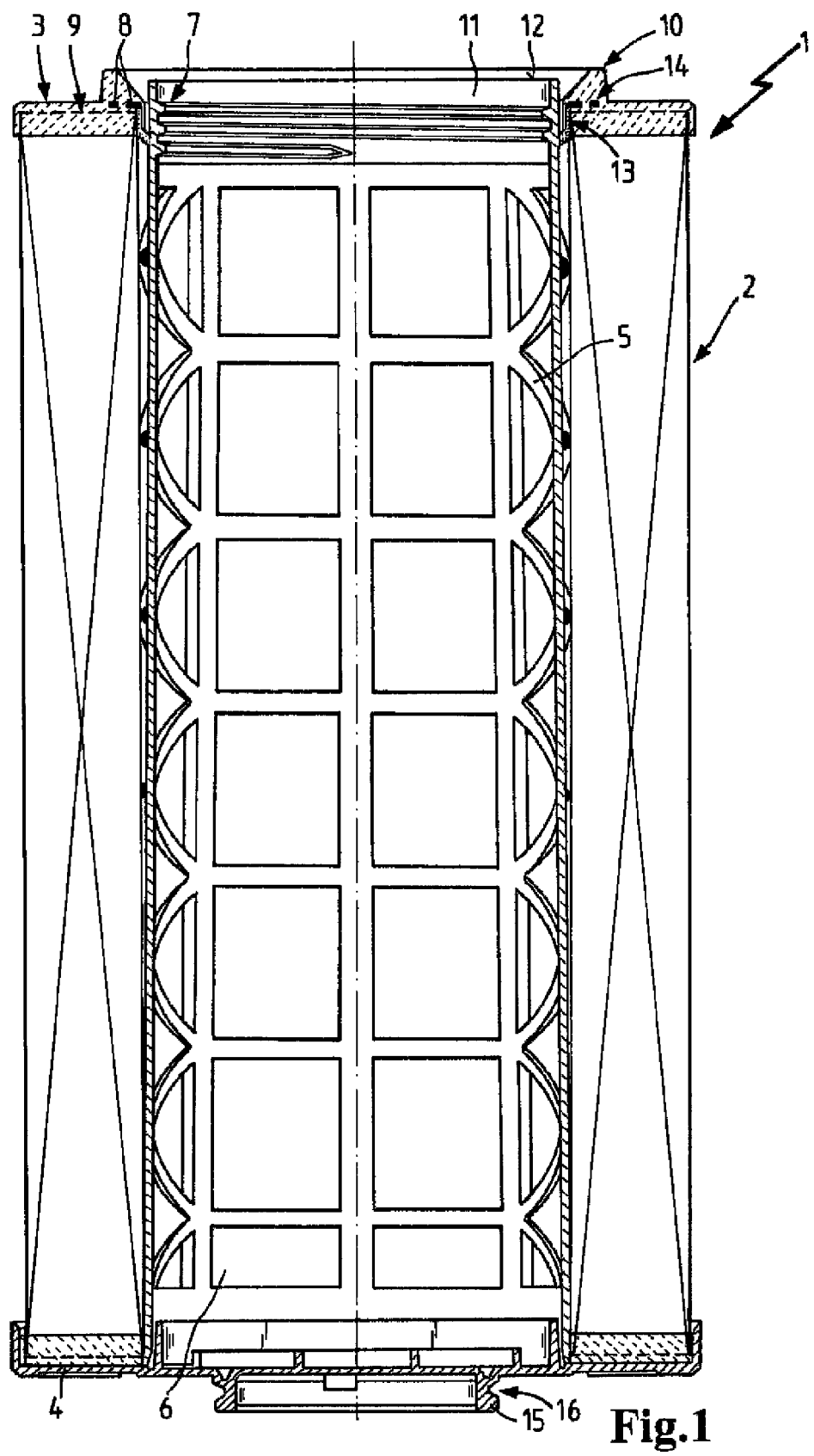
FIG. 1 shows a section view of an embodiment of the filter element in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a filter element for fluid filtration. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The filter element 1 shown in FIG. 1 comprises a hollow-cylindrical filter medium 2 that is folded in a star shape as well as an outlet-side end disk 3 and a second end disk 4 and a hollow-cylindrical support lattice 5 which is arranged in the interior 6 of the filter medium 2. The support lattice 5 is preferably resting on the inner wall of the hollow-cylindrical filter medium 2 and extends from the outlet-side end disk 3 to the second end disk 4. The support lattice 5 has at the outlet-side end of the filter element 1 a connecting area 11 where the support lattice ends with a coupling element which is formed as an inner thread.

The support lattice is manufactured by injection molding from plastic material, e.g., PP, PE, PA, and has in the connecting area 11 a collar 8 that extends in radial direction outwardly and projects partially past the outlet-side end face 9 of the filter medium 2. This collar is enclosed, together with the outlet-side end face 9 of the filter medium, by the outlet-side end disk 3 which is preferably comprised of an elastically deformable plastic material, in particular foamed PUR. The outlet-side end disk 3 has an annular axial seal 10 for separation of the raw side from the clean side in the filter housing. The axial seal 10 is preferably monolithically formed together with the outlet-side end disk 3 as an annular axial projection which, upon assembly of the filter element, is compressed within a housing.

The outlet-side end face 9 of the filter medium is not directly resting at the collar. This has the advantage that length tolerances of the filter medium resulting from manufacturing the end disk can be compensated. Advantageously, between collar 8 and end face 9 of the filter medium a gap is provided which is filled by the end disk material. In this way, the transmission of forces, generated at the axial seal, onto the filter medium can be minimized.

The connecting area 11 has at its end an axial contact surface 12 for resting against a filter housing. In this way, when assembling the filter element 1, its end position is determined substantially by the size of the support lattice. The seal 10 is deformed to such an extent as is permissible by the geometry of the connecting area 11. In this way, the position of the filter element 1 is independent of the hardness tolerances and size tolerances of the axial seal.

The axial seal 10 is positioned with respect to the radial position in the area of the collar 8. In this way, the force that is generated by clamping of the filter element in the housing will act on the collar 8 and is supported by the latter. In this way, shearing forces at the connecting locations between end disk material 3 and filter material or support lattice material can be avoided.

The collar comprises a first section 13 extending parallel to the center axis and a second section 14 that adjoins the first section and extends perpendicularly to the center axis. The sections define in this way an angle that encloses the inner edge of the outlet-side end face 9 of the filter medium.

The collar 8 is embodied as a lattice. In this way, end disk material can penetrate the collar 8. This has the advantage that the loadability of the connection between collar and end disk material is improved.

The first section 13 extends parallel to and at a spacing from the connecting area 11 of the support lattice. In this context, it is advantageously connected by means of an annular circumferentially extending web or a plurality of webs arranged circumferentially with the connecting area 11. In this way, the collar can be embedded in such a way in the outlet-side end disk 3 that the material of the end disk is not connected with the main part of the support lattice 5 or with connecting area 11. This is in particular advantageous in case of end disks which are produced by a casting process, in particular in casting molds, of materials such as polyurethane (PUR) that in the raw state are flowable and which are connected in this way with the filter medium and the collar. The second collar section 14 adjoins the first section 13 and extends radially in outward direction.

The first, 13, as well as the second collar section 14 are embedded in the end disk material or the end disk 3 wherein, however, because of the radial spacing of the first collar section 13 relative to the support lattice, there is no contact between end disk and support lattice. In this way, the end disk can be cast in a simple annular mold.

The axial seal 10 projects in the unclamped state past the axial contact surface 12. Upon assembly of the filter element, the seal, independent of its height in the unclamped state, is compressed to the level of the contact surface.

The sealing surface of the housing serves in this connection at the same time as a stop for the contact surface 12 of the support lattice.

The second end disk 4 is of a closed embodiment and has a connecting element 15 for connecting the filter element with a housing part wherein the connecting element 15 is formed on a ledge of the second end disk 4 of the filter element 1. The connecting element is in particular embodied as an at least partially circumferentially extending groove 16 that can be engaged by a locking element that is arranged on the housing so as to be radially slidable. In this connection, the second end disk is preferably made of a material that, in comparison to the outlet-side end disk, is hard (for example, polypropylene (PP), polyester (PEs), polyethylene (PE), polyamide (PA)), preferably made by injection molding.

In an advantageous further embodiment, the second end disk 4 is connected fixedly with the support lattice, for example, by an adhesive connection or weld connection or preferably by a potting compound, in particular of the same material as the clean-side end disk that upon hardening connects with form fit the second end disk with the filter medium and the support lattice and encloses seal-tightly the second end face of the filter medium.

The connection of the support lattice with the second end disk has the advantage that the support lattice of the filter element can be used as a tie anchor in a filter housing that has axially separated housing parts. In this way, closure elements or tie anchor elements on the housing can be eliminated. In this way, it can be advantageously ensured in an effective way that a connection of housing parts without inserted filter element embodied according to the invention is not possible because then the housing parts will simply fall apart. It is therefore in particular not possible to operate the air filter unit deliberately or accidentally without inserted air filter element. A further advantage is that, by means of the defined connection of the second end disk with the support lattice, the total length of the filter element and thus in particular the spacing between the axial contact surface and the connecting element of the second end disk is producible with minimal tolerances independent of material quality fluctuations of the end disk material of the outlet-side end disk and independent of length tolerances of the filter medium.

Figure 2:
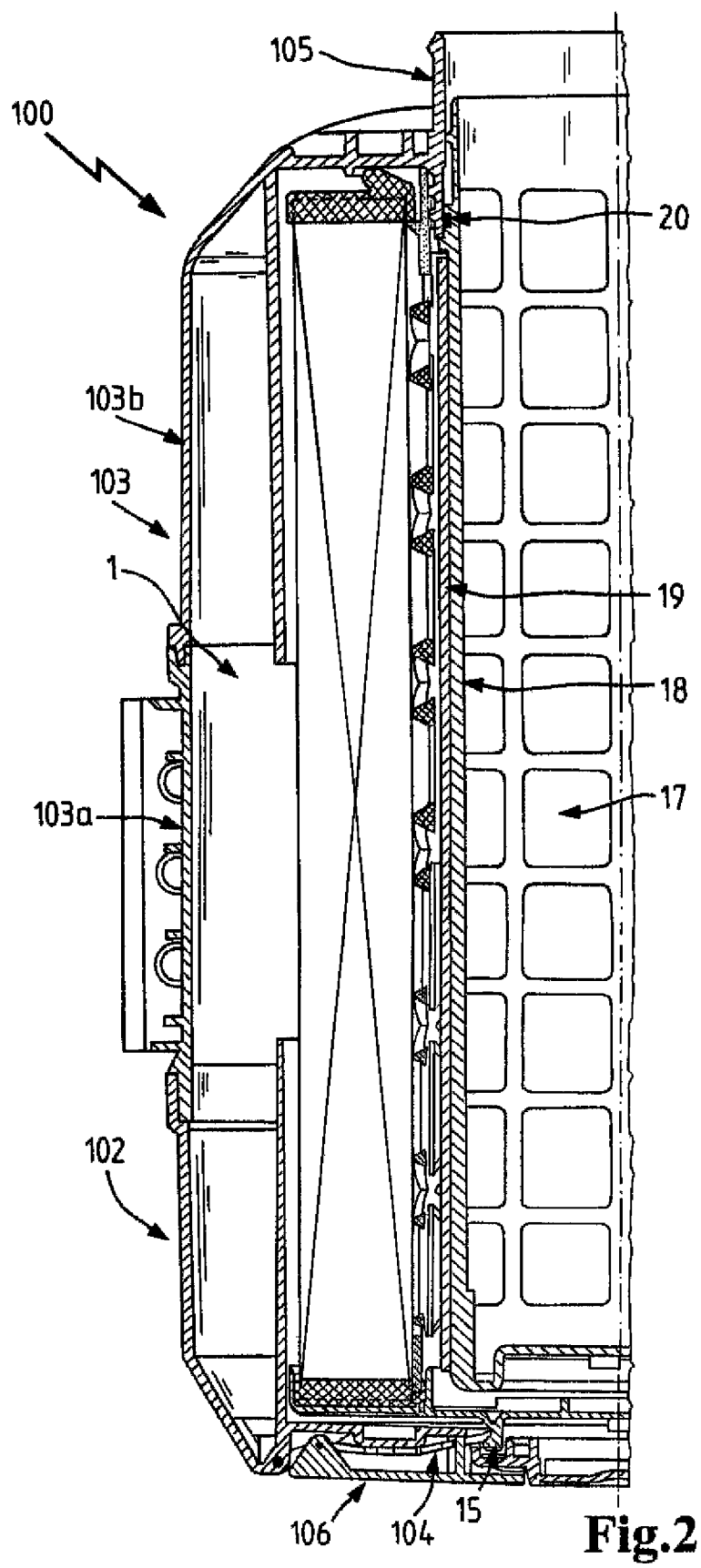
FIG. 2 shows a partial section view of an embodiment according to the invention of an air filter unit.

FIG. 2 shows the filter element 1 in the installed state in the air filter unit. The air filter unit 100 comprises the filter element 1 and a secondary air filter element 17 as well as, moreover, a housing 101 in which the elements are received. The housing 101 comprises a housing base element 103 and a housing cover 102. The housing cover 102 can be pushed onto the housing base element 103. The housing base element is comprised in an advantageous embodiment of a base part 103a and an outlet part 103b on which the outlet socket 105 is arranged. The socket part 103a and the outlet part 103b are either embodied monolithically as an injection molded part or as separate components connected seal-tightly by a weld connection, in particular a laser, friction, rotation or vibration weld connection. The secondary air filter element 17 comprises preferably a central tube 18 and is inserted into the outlet socket 105 and sealed relative thereto with a radial seal 20.

In the area of the connecting element 15, two oppositely positioned radially slidable locking elements 104 are provided on the housing cover 102 that engage the groove 16 of the connecting element 15 so that the filter element is locked with form fit with the housing cover 102. Preferably, the locking elements 104 are moved and secured by lever 106.

Inasmuch as the groove 16 is configured to extend continuously, the filter can be positioned in any position relative to the housing cover 102.

Figure 3:
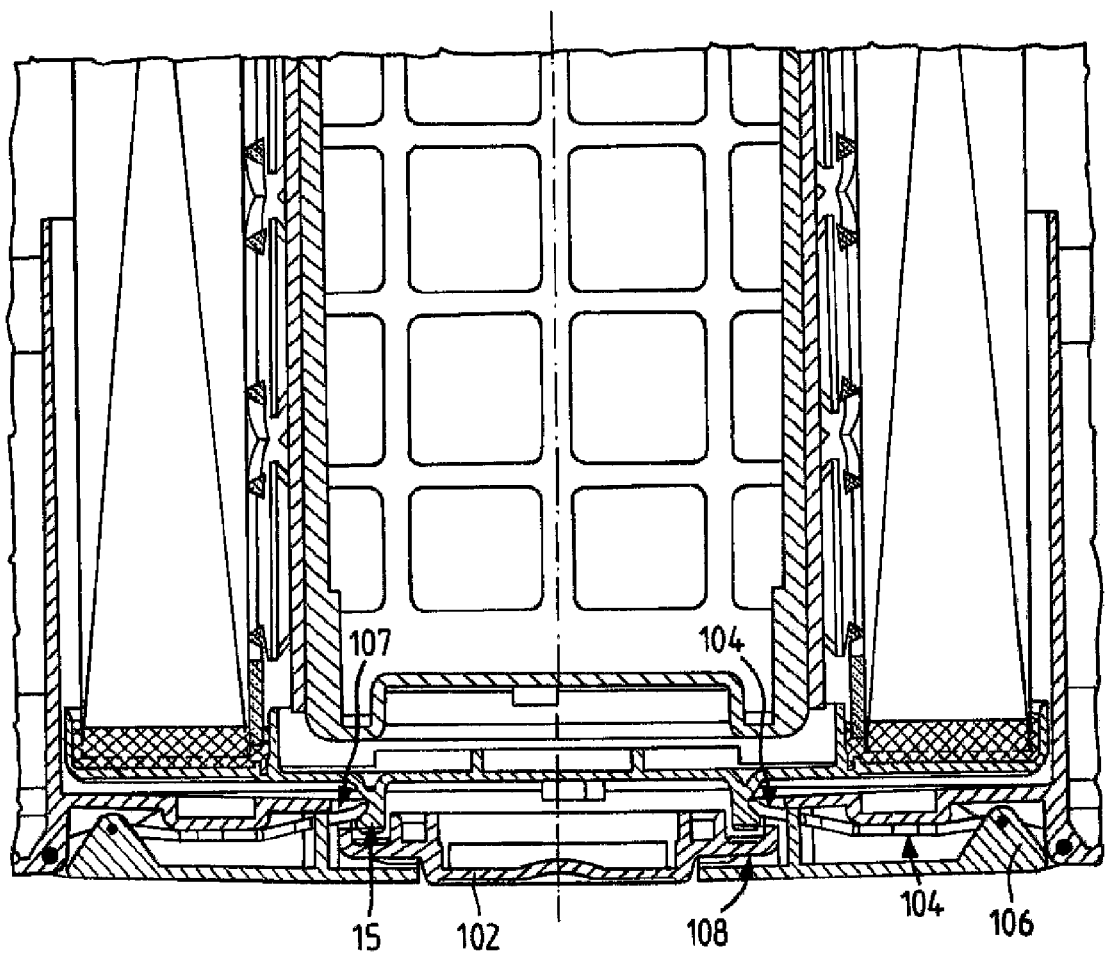
FIG. 3 shows a detail of a section view of an air filter element according to the invention.

FIG. 3 shows in a partial view the connecting area of the filter element 1 with the housing cover 102. The two locking elements 104 are positioned opposite each other and engage the groove 16 of the second end disk 4 in the illustrated end position. The housing cover 102 has for this purpose a slotted opening 107 for the locking element 104, respectively, through which the locking elements 104 project into the interior of the housing. For releasing the connection, the lever 106 is lifted and, by doing so, the locking element 104 is pulled out of the groove 16. The housing cover 102 has in the interior an annular recess 108 that is facing the filter element and into which the connecting element can be inserted upon assembly. In an advantageous embodiment, radially extending webs are arranged in the recess 108 which can be brought into engagement with matching grooves in the connecting element. In this way, the filter element 1 can be first inserted into and locked in the housing cover 102 and, subsequently, can be screwed into the housing base element 103.

Figure 4:
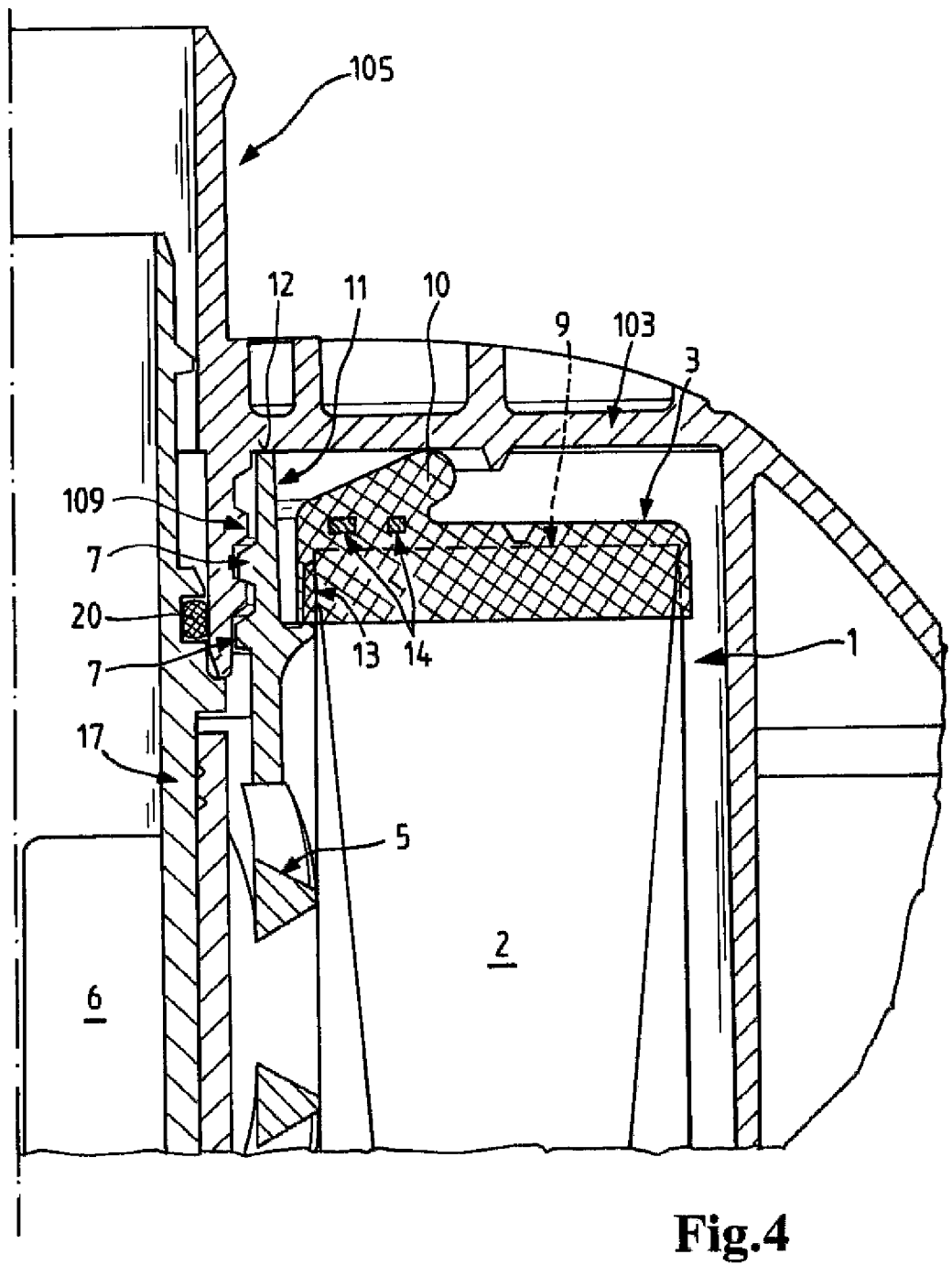
FIG. 4 shows a detail view of a connecting area of an air filter unit according to the invention.

FIG. 4 shows a detail view of the connecting area of the filter element 1 with the housing base element 103 as well as the secondary air filter element 17. The secondary air filter element 17 is pushed into the mounting socket 109 and has a radial seal 20 for sealing relative to the mounting socket. In the connecting area 11 of the filter element 1, the support lattice 5 is embodied as a tubular projection which at the inner surface has a slightly conical buttress thread as a coupling element 7. For assembly of the filter element, the housing base element 103 is provided with an assembly socket 109 that is also tubular and extends into the interior of the housing and has a matching conically embodied buttress thread. With the conical configuration of the thread and the embodiment as a buttress thread where the contact surfaces have a flat angle (approximately 0 to 20 degrees) relative to end face 9, mounting and dismounting of the filter element, in particular with respect to the required forces, are facilitated. The filter element 1 is shown in the mounted state in which the contact surface 12 forming the end of the support lattice 5 is resting against the inner surface of the housing base element 103 wherein also the inner surface of the housing base element 103 also represents the sealing surface of the housing where the axial seal 10 is resting. The degree of compression of the axial seal 10 formed integrally on the end disk 3 is determined solely by the position of the contact surface 12. Possible height tolerances of the seal in relation to the support lattice 5 and in relation to the second collar section 14 or the end face 9 of the filter medium 2 have thus no effect on the position of the second end disk 4 and the connecting element 15 arranged thereat (not shown in FIG. 4). By means of this arrangement, in case that the filter medium shrinks in longitudinal direction when dried after water introduction, the sealing action of the axial seal 10 is ensured, on the one hand, and, because of the fixed connection of the second end disk 4 with the support tube 5, also the position of the connecting element 15 arranged at the second end disk is positionally fixed, on the other hand, so that a reliable mounting of the housing cover 102 is achieved on the housing base element 103. Moreover, it is ensured that the locking elements 104 can engage the groove 16 of the second end disk 4 in any tolerance position.

Figure 5:
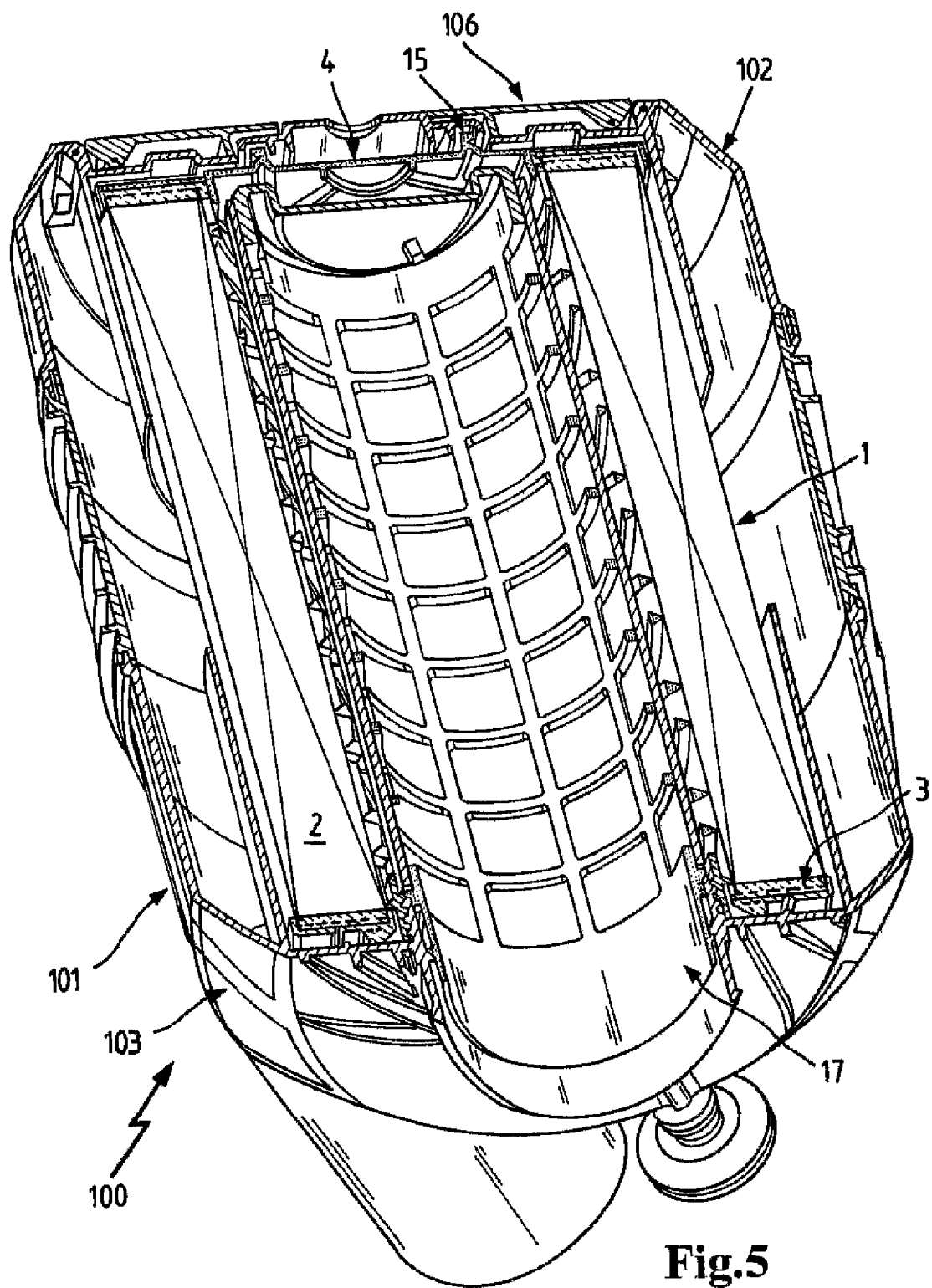
FIG. 5 shows an isometric section view of an air filter unit according to the invention.

FIG. 5 shows an isometric section view of an air filter unit 100 according to the invention with a filter element 1 and a housing 101.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims The invention is defined solely by the appended claims including any amendments made during the pendency of this application and all equivalents of those claims as issued.

The invention claimed is:

1. A filter element (1) for fluid filtration of intake air of an internal combustion engines, comprising a hollow-cylindrical star shape-folded filter medium (2) having a center axis;

an outlet-side end disk (3) arranged at an outlet side end face of the filter medium (2);

a second end disk (4) arranged at an axially opposing end face of the filter medium (2);

a hollow-cylindrical support lattice (5) which is arranged in the interior (6) of the filter medium, the hollow-cylindrical support lattice extending from the outlet-side end disk to the second end disk through the interior of the filter medium;

wherein the support lattice at the outlet-side end of the filter element has a connecting area (11) including a coupling element (7) for coupling the filter element to an outlet socket of a filter housing;

wherein the support lattice (5) in the connecting area (7) has a collar (8) at a radial exterior of a main part the hollow cylindrical support lattice, the collar (8) including:

a first collar section having
a first end secured to the exterior of the main part of the hollow cylindrical support lattice and extending in direction of the center axis axially to a second end;
a second collar section joined to an opposing axial end of the first collar section, the second collar section projecting in radial direction outwardly and partially projects past the outlet-side end face (9) of the filter medium;

wherein the outlet-side end disk (3) encloses the outlet-side end face (9) of the filter medium (2) and the collar (8) and has an annular axially projecting seal (10) configured to seal axially by axial compression within the filter housing;

wherein the second collar section is spaced apart from the outlet side end face of the filter medium;

wherein material of outlet-side end disk is not connected with the main part of the support lattice or the connecting area.

2. Filter element according to claim 1, wherein the axial seal (10) is monolithically embodied together with the outlet-side end disk (3).

3. Filter element according to claim 1, wherein the connecting area (11) at its end has an axial contact surface (12) for contacting a filter housing.

4. Filter element according to claim 1, wherein the axial seal (10) with regard to the radial position is arranged in the area of the collar (8).

5. Filter element according to claim 1, wherein the axial seal (10) is deformable and can be clamped upon assembly of the filter element and in the un-clamped state projects in the axial direction past the axial contact surface (12).

6. Filter element according to claim 1, wherein the first collar section (13) extends parallel to the center axis and
the second collar section (14) adjoining the first section (13) and extends perpendicularly to the center axis.

7. Filter element according to claim 1, wherein the second end disk (4) is of a closed configuration.

8. Filter element according to claim 1, wherein the second end disk (4) has a connecting element (15) for connecting the filter element (1) with a housing cover (102).

9. Filter element according to claim 8, wherein the connecting element is embodied as a radial groove (16) extending at least partially circumferentially for engagement of housing-side radially slidable locking elements (104).

10. An air filter unit with a radially separable housing (101) and a filter element insertable therein, comprising:
the filter element according to claim 1;
a housing comprising at least two housing parts (102, 103) that, in axial direction, are connected to each other by means of a tie anchor element;
wherein the tie anchor element is formed by the support lattice (5) of the filter element (1) engaging and securing together the at least two housing parts.

11. The air filter unit according to claim 10, wherein in the interior of the filter element (1) a secondary air filter element (17) is arranged.

* * * * *